(12) United States Patent
Kwon et al.

(10) Patent No.: US 9,325,028 B2
(45) Date of Patent: Apr. 26, 2016

(54) FLEXIBLE SECONDARY BATTERY

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Moon-seok Kwon, Hwaseong-si (KR); Jae-man Choi, Hwaseong-si (KR); Seok-gwang Doo, Seoul (KR); Jeong-kuk Shon, Hwaseong-si (KR); Min-sang Song, Seongnam-si (KR); Seung-sik Hwang, Seongnam-si (KR)

(73) Assignees: SAMSUNG ELECTRONICS CO., LTD. (KR); SAMSUNG SDI CO., LTD. (KR)

( * ) Notice: Subject to any disclaimer, the term of this patent is extended or adjusted under 35 U.S.C. 154(b) by 321 days.

(21) Appl. No.: 13/889,400

(22) Filed: May 8, 2013

(65) Prior Publication Data

US 2014/0079979 A1    Mar. 20, 2014

(30) Foreign Application Priority Data

Sep. 14, 2012  (KR) .................. 10-2012-0102264

(51) Int. Cl.
*H01M 10/04*  (2006.01)
*H01M 2/08*  (2006.01)
*H01M 2/26*  (2006.01)

(52) U.S. Cl.
CPC ............ *H01M 10/0436* (2013.01); *H01M 2/08* (2013.01); *H01M 2/266* (2013.01); *H01M 2220/30* (2013.01); *Y10T 29/49108* (2015.01)

(58) Field of Classification Search
CPC ... H10M 2/08; H01M 2/266; H01M 10/0436; H01M 2220/30

USPC .......................................... 429/127; 29/623.1
See application file for complete search history.

(56) References Cited

U.S. PATENT DOCUMENTS 6,599,659 B1   7/2003 Endo et al.
2003/0059673 A1   3/2003 Langan et al.
(Continued)

FOREIGN PATENT DOCUMENTS

JP    10-509839 A    9/1998
JP   20030123706 A    4/2003
(Continued)

OTHER PUBLICATIONS

International Search Report; PCT/KR2013/008287; Nov. 6, 2013.
(Continued)

*Primary Examiner* — Mark F Huff
*Assistant Examiner* — Monique Wills
(74) *Attorney, Agent, or Firm* — Cantor Colburn LLP (57) ABSTRACT

A flexible secondary battery includes an electrode stack structure. The electrode stack structure includes a first electrode layer including a first metal current collector, a second electrode layer including a second metal current collector, an isolation layer between the first electrode layer and the second electrode layer, connection tabs respectively extended from an end portion of the first metal current collector at a first end portion of the first electrode layer and an end portion of the second metal current collector at a first end portion of the second electrode layer; and a fixing element which fixes the end portions of the first and second metal current collectors only at a first end portion of the electrode stack structure. Second end portions of the first and second electrode layers opposite to the first end portions thereof are movable.

17 Claims, 6 Drawing Sheets

(56) References Cited

U.S. PATENT DOCUMENTS

| | | |
|---|---|---|
| 2003/0215702 A1* | 11/2003 | Tanjou et al. ............... 429/127 |
| 2005/0191545 A1* | 9/2005 | Bowles et al. ............... 429/127 |
| 2012/0058378 A1 | 3/2012 | Lee et al. |
| 2012/0121963 A1 | 5/2012 | Kwon et al. |
| 2012/0183825 A1 | 7/2012 | Lee et al. |

FOREIGN PATENT DOCUMENTS

| | | |
|---|---|---|
| KR | 10-2007-0073169 A | 7/2007 |
| KR | 1020110098108 A | 9/2011 |
| KR | 10-2012-0007508 A | 1/2012 |
| WO | 9617396 | 6/1996 |
| WO | 2010105790 A1 | 9/2010 |

OTHER PUBLICATIONS

Written Opinion of the International Searching Authority; PCT/KR2013/008287; Nov. 6, 2013.

* cited by examiner

FLEXIBLE SECONDARY BATTERY

CROSS-REFERENCE TO RELATED APPLICATIONS

This application claims the benefit of Korean Patent Application No. 10-2012-0102264, filed on Sep. 14, 2012, in the Korean Intellectual Property Office, the disclosure of which is incorporated herein in its entirety by reference.

BACKGROUND

1. Field

Provided are secondary batteries, and in particular, flexible secondary batteries.

2. Description of the Related Art

Development of electronic technology has led to a rapid expansion of markets for various electronic devices, such as smartphones, smart pads, electronic books, watch-shaped telephones, and mobile medical devices that are attached to the human body, in addition to mobile phones, game players, portable multimedia players ("PMPs"), and moving picture experts group ("MPEG") audio layer-3 ("MP3") players.

Due to the growth of the markets for such mobile electronic devices, a demand for batteries that are suitable for driving these mobile electronic devices is increasing. In addition, a demand for flexibility of the mobile electronic devices is increasing in relation to the use, movement and safekeeping of the mobile electronic devices and to the durability against a shock. Consequently, a demand for flexibility of a battery is also gradually increasing to embody the flexibility of these mobile electronic devices.

SUMMARY

Provided are flexible secondary batteries in which a fixing element is disposed at one end portion thereof and thus stability may be maintained in spite of a repeated warp motion or bend motion of an opposite end portion thereof.

Additional aspects will be set forth in part in the description which follows and, in part, will be apparent from the description, or may be learned by practice of the presented embodiments.

Provided is a flexible secondary battery including: an electrode stack structure that includes a first electrode layer including a first metal current collector, a second electrode layer including a second metal current collector, an isolation layer between the first electrode layer and the second electrode layer, connection tabs respectively extended from an end portion of the first metal current collector at a first end portion of the first electrode layer and an end portion of the second metal current collector at a first end portion of the second electrode layer; and a fixing element which fixes the end portions of the first and second metal current collectors only at a first end portion of the electrode stack structure. Second end portions of the first and second electrode layers opposite to the first end portions thereof are movable.

The flexible secondary battery may further include a protection layer disposed on an outer surface of the electrode stack structure.

A bending stiffness of the protection layer may have a larger value than an average bending stiffness of individual layers of the electrode stack structure.

The bending stiffness of the protection layer may be about 1.5 times or more the average bending stiffness of the individual layers of the electrode stack structure.

The thickness of the protection layer may be from about 15 micrometers (um) to about 1 millimeter (mm).

A tensile modulus of elasticity of the protection layer may be from about 0.5 gigapascals (GPa) to about 300 GPa.

The protection layer may include a polymer film, a film including a laminated polymer film layer, a metal foil or a complex material film including carbon.

The fixing element may include an adhesive or an adhesive-coated tape.

The electrode stack structure may further include a hole defined in one end portion of each of the first metal current collector, the second metal current collector and the isolation layer, and the fixing element may be disposed in the hole.

The electrode stack structure may further include a groove defined in one end portion of each of the first metal current collector, the second metal current collector and the isolation layer, and the fixing element may be in the groove.

The fixing element may surround outer surfaces of the first end portion of the electrode stack structure The flexible secondary battery may further include a reinforcement element disposed around the connection tabs.

The connection tabs may be connected to external lead tabs, and extension portions of the lead tabs may extend in a length direction of the electrode stack structure and overlap the connection tabs.

A total length of the electrode stack structure is taken in a first direction, and a length of the fixing element at the first end portion of the electrode stack structure is taken in a second direction perpendicular to the first direction and is about 2 mm or greater.

A ratio of the total length of the electrode stack structure to the length of the fixing element may be 20 or less.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, where like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

It will be understood that when an element or layer is referred to as being "on," or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Flexibility of a mobile electronic device is desired in relation to the use, movement and safekeeping of the mobile electronic device and to durability against a shock or external impact applied thereto. Consequently, a battery suitable for the flexible mobile electronic device is also desired.

If a battery that is not sufficiently flexible is bent, stress may focus on, for example, an interface of a separator and electrode active material layers of two electrodes, an inner interface of an electrode active material layer, or an interface of an electrode active material layer and a current collector, thereby causing peeling. This may negatively affect the performance and lifespan of the battery.

If a typical battery is warped or bent, the function thereof may be deteriorated or a dangerous reaction may occur, and thus, the typical battery is not suitable for flexible electronic devices. Some sheet-type batteries are made thin to bend. However, if a battery is made thin, energy to be stored therein is small, thereby limiting the usage thereof. Therefore, there remains a need for a sufficiently flexible battery suitable for flexible electronic devices.

Hereinafter, the invention will be described in detail with reference to the accompanying drawings.

Figure 1A:
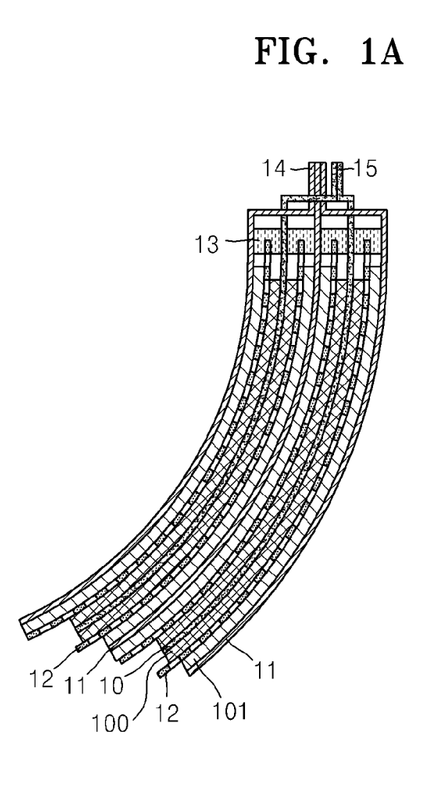
FIGS. 1A through 1C are cross-sectional views illustrating an electrode stack structure of an embodiment of a flexible secondary battery according to the present invention.
Figure 1B:
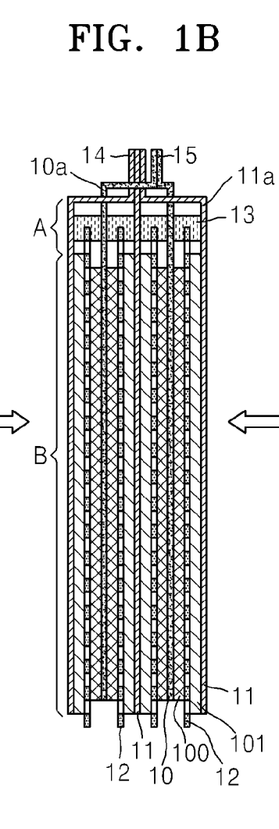
Figure 1C:
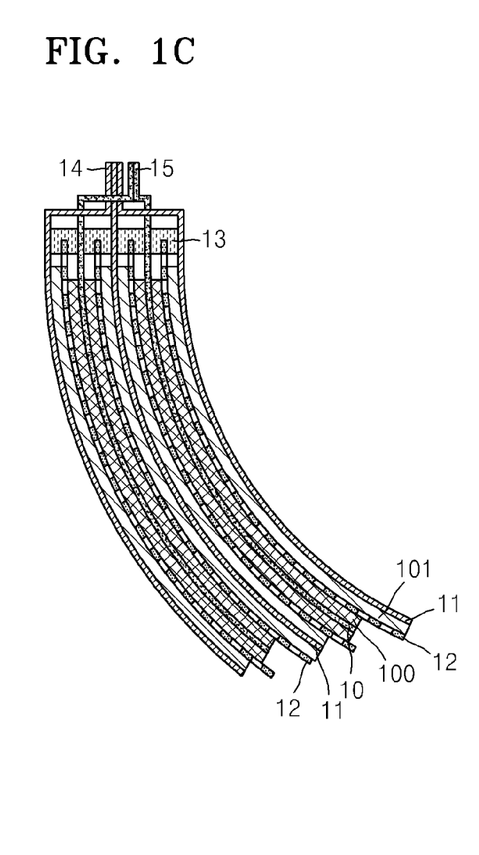

FIGS. 1A through 1C are cross-sectional views illustrating an electrode stack structure of an embodiment of a flexible secondary battery according to the present invention. Referring to FIGS. 1A through 1C, an embodiment of the flexible secondary battery according to the invention may include an electrode stack structure in which a first electrode layer 10 and 100, a second electrode layer 11 and 101, and an isolation layer 12 disposed between the first electrode layer 10 and 100 and the second electrode layer 11 and 101 are stacked.

The electrode stack structure may have a structure in which a plurality of first electrode layers 10 and 100, a plurality of second electrode layers 11 and 101, and a plurality of isolation layers 12 are stacked. Protruding connection tabs 10a and 11a may be disposed at end portions of a first metal current collector 10 of the first electrode layer 10 and 100 and end portions of a second metal current collector 11 of the second electrode layer 11 and 101, respectively. Respective extension portions 14 and 15 of the connection tabs 11a and 10a may be connected to external lead tabs.

A fixing element 13 which fixes the first metal current collector 10, the second metal current collector 11 and the isolation layer 12 to each other may be disposed at the end portions of the first and second metal current collectors 10 and 11 at which the connection tabs 10a and 11a are disposed. The fixing element 13 may be disposed at a first end portion A of the electrode stack structure, in which the connection tabs 10a and 11a of the first and second metal current collectors 10 and 11 are disposed, and a fixing element may not be disposed at an opposing second end portion of the electrode stack structure. A change in relative positions of layers of the electrode stack structure at the opposing second end portion of the electrode stack structure, at which a fixing element is not disposed, may be larger than the change in relative positions of the layers of the electrode stack structure at the first end portion A of the electrode stack structure, in which the fixing element 13 is disposed.

As illustrated in FIG. 1B, since the fixing element 13 is disposed only at the first end portion A of the electrode stack structure, an area B in which the fixing element 13 is not disposed may be repeatedly bent. That is, the fixing element 13 fixes and maintains the layers of the electrode stack structure in a predetermined position at the first end portion A of the electrode stack structure. The fixing element 13 exposes the opposing second end portion of the electrode stack structure, since the fixing element 13 is not disposed at the second end portion. When the electrode stack structure is bent from an original position (FIG. 1B), the opposing second ends of the layers of the electrode stack structure are movable such as with respect to each other, since they are unrestricted and not fixed by the fixing element 13.

In the illustrated embodiment of the present invention, an area B may be bent from an original position shown in FIG. 1B to a first bent position shown in FIG. 1A or to a second bent position shown in FIG. 1C. In addition, since the fixing element 13 fixes the first metal current collector 10, the second metal current collector 11 and the isolation layer 12 to each other, the first electrode layer 10 and 100 and the second electrode layer 11 and 101 disposed at both of opposing sides of the isolation layer 12, may maintain an alignment for a reversible electric and chemical reaction. Furthermore, when the electrode stack structure is repeatedly bent, a relative position of each of the layers constituting the electrode stack structure is maintained, and thus, an electric and chemical reaction, such as electric charge and discharge, may be practicable even after repeated bend motions.

If the flexible secondary battery omits the fixing element 13, relative positions of layers constituting the electrode stack structure may be changed when the electrode stack structure is repeatedly bent, thereby disarranging an alignment between the layers. Accordingly, when an alignment between layers is disarranged, the amount of the reversible electric and chemical reaction between the electrode layers may be reduced, and in severe cases, a short circuit may occur between the electrode layers. In addition, if the fixing element 13 is disposed at both opposing end portions of the electrode stack structure, when the electrode layers internally bend, delamination, detachment and adhesion degradation of the electrode stack structure may occur or a portion of the fixing element 13 may break, due to stress by the internal bending. Where the fixing element 13 is disposed at both opposing end portions of the electrode stack structure, the alignment between the electrode layers may not be maintained well. Therefore, in order to reduce or effectively prevent such phenomena, in the embodiment of the flexible secondary battery according to the present invention, the fixing element 13 is disposed only at one end portion where the connection tabs 10a and 11a of the electrode stack structure are disposed.

If a fixing element 13 is not disposed at the first end portion A where the connection tabs are disposed, but is instead disposed in the second end portion, relative positions of the electrode layers may be changed at the first end portion A when the electrode stack structure is repeatedly bent. The connection tabs 10a and 11a are located at the first end portion A and a plurality of current collectors are joined thereto. Thus, when the relative positions of the electrode layers at the first end portion A are changed, the connection tabs 10a and 11a may be folded and/or cut if the change in the relative positions is repeated and as a result, the performance of the battery may be deteriorated. Therefore, in order to reduce or effectively prevent such phenomenon, in the embodiment of the flexible secondary battery according to the present invention, the fixing element 13 is disposed only at the first end portion A where the connection tabs 10a and 11a and the plurality of current collectors are joined thereto are disposed.

Materials of the electrode stack structure of the embodiment of the flexible secondary battery according to the present invention will now be described.

The first electrode layer 10 and 100 may be one of a positive film and a negative film. When the first electrode layer 10 and 100 is a positive film, the second electrode layer 11 and 101 may be a negative film. When the first electrode layer 10 and 100 is a negative film, the second electrode layer 11 and 101 may be a positive film.

The first electrode layer may collectively include the first metal current collector 10, and a first active material layer 100 disposed on a surface of the first metal current collector 10. The first electrode layer may include one or more of the first metal current collector 10 and one or more of the first active material layers 100. In one embodiment, the first electrode layer may include one first metal current collector 10 between two first active material layers 100.

The second electrode layer may collectively include the second metal current collector 11, and a second active material layer 101 disposed on a surface of the second metal current collector 11. The second electrode layer may include one or more of the second metal current collector 11 and one or more of the second active material layers 101. In one embodiment, the second electrode layer may include one second metal current collector 10 between two second active material layers 101.

If the first electrode layer 10 and 100 is a positive film, the first metal current collector 10 may be a positive current collector and the first active material layer 100 may be a positive active material layer. If the second electrode layer 11 and 101 is a negative film, the second metal current collector 11 may be a negative current collector and the second active material layer 101 may be a negative active material layer.

The positive current collector may include aluminum, stainless steel, titanium, copper, silver or a combination thereof. The positive active material layer may include a positive active material, a binder and/or a conductive material.

The positive active material of the positive active material layer may include a material that may reversibly occlude or discharge (e.g., alloy and dealloy, or intercalate and deintercalate) lithium ions. In one embodiment, for example, the positive active material layer may include at least one selected from lithium transition metal oxides such as lithium cobalt oxide, lithium nickel oxide, lithium nickel cobalt oxide, lithium nickel cobalt aluminum oxide, lithium nickel cobalt manganese oxide, lithium manganese oxide lithium iron phosphate, nickel sulfide, copper sulfide, sulfate, iron oxide and vanadium oxide.

The binder may include at least one selected from a polyvinylidene fluoride-based binder such as polyvinylidene fluoride, vinylidene fluoride/hexafluoropropylene copolymer vinylidene fluoride/tetrafluoroethylene copolymer, a carboxymethyl cellulose-based binder such as at least one selected from sodium-carboxymethyl cellulose and lithium-carboxymethyl cellulose, an acrylate-based binder such as at least one selected from polyacrylic acid, lithium-polyacrylic acid, acryl, polyacrylonitrile, polymethyl methacrylate and polybutyl acrylate, polyamideimide, polytetrafluoroethylene, polyethylene oxide, polypyrrole, lithium-nafion and a styrene butadiene rubber-based polymer.

The conductive material may include at least one selected from a carbon-based conductive material such as at least one selected from carbon black, carbon fiber and graphite, a conductive fiber such as a metal fiber, a metal powder such as at least one selected from aluminum powder and nickel powder, carbon fluoride powder, a conductive whisker such as at least one selected from zinc oxide and potassium titanate, a conductive metal oxide such as titanium oxide, and a polyphenylene derivative.

The negative current collector may include at least one metal selected from copper, stainless steel, nickel, aluminum and titanium. The negative active material layer may include a negative active material, a binder and a conductive material.

The negative active material of the negative active material layer may include a material that may become an alloy with lithium, or reversibly occlude or discharge lithium. In one embodiment, for example, the negative active material may include at least one selected from a metal, a carbon-based material, a metal oxides and a lithium metal nitride.

The metal of the negative active material may include at least one material selected from lithium, silicate, magnesium, aluminum, germanium, tin, lead, arsenic, antimony, bismuth, silver, gold, zinc, cadmium, mercury, copper, iron, nickel, cobalt and indium. The carbon-based material of the negative active material may be at least one selected from graphite, graphite carbon fiber, coke, mesocarbon microbeads ("MCMB"), polyacene, pitch-based carbon fiber and hard carbon. The metal oxide of the negative active material may include at least one selected from lithium titanium oxide, titanium oxide, molybdenum oxide, niobium oxide, iron oxide, tungsten oxide, tin oxide, amorphous tin mixed oxide, silicon monoxide, cobalt oxide and nickel oxide.

The binder and the conductive material of the negative active material layer may be the same as that included in the positive active material layer.

In one embodiment of a manufacturing method of a flexible secondary battery, the positive film or the negative film may be formed by coating an active material layer on a metal current collector by using any one of various methods, and a method of coating the active material layer is not limited.

The isolation layer 12 may include a porous polymer layer, such as a polyethylene film or a polypropylene film, and may include a woven or non-woven fabric including a polymer fiber. In addition, the isolation layer 12 may include ceramic particles, and may include a polymer solid electrolyte. In one embodiment, the isolation layer 12 may be an independent film which is formed separate from the electrode layers and coupled with the electrode layers, or the isolation layer may be formed by disposing a non-conductive porous layer on the first electrode layer 10 and 100 or the second electrode layer 11 or 101. The isolation layer 12 electrically isolates the first electrode layer 10 and 100 and the second electrode layer 11 and 101 from each other. The isolation layer 12 may or may not have a same shape as that of the first electrode layer 10 and 100 and/or the second electrode layer 11 and 101.

Figure 2A:
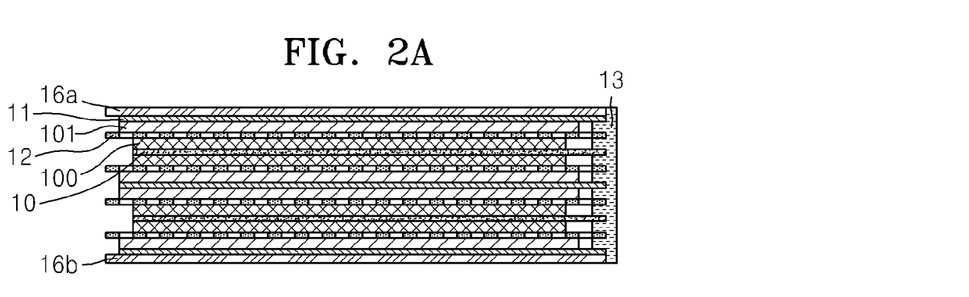
FIGS. 2A and 2B are diagrams illustrating another embodiment of a flexible secondary battery including protection layers on upper and lower surfaces of an electrode stack structure, according to the invention.
Figure 2B:
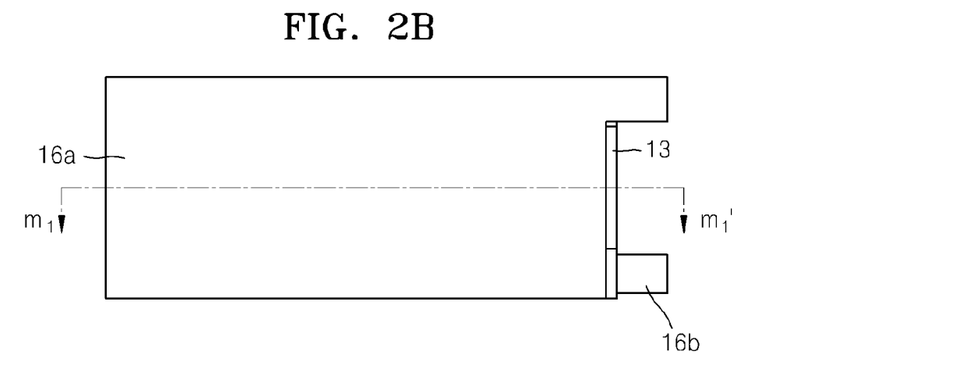

FIGS. 2A and 2B are diagrams illustrating another embodiment of a flexible secondary battery including protection layers 16a and 16b on upper and lower surfaces of an electrode stack structure, according to the present invention. FIG. 2B illustrates a plan view of the structure, and FIG. 2A illustrates a cross-sectional view taken along line m1-m1' of FIG. 2B.

Referring to FIGS. 2A and 2B, the protection layers 16a and 16b are disposed on an outer surface, that is, the upper and lower surfaces, of the electrode stack structure that includes the first electrode layer 10 and 100, the second electrode layer 11 and 101, and the isolation layer 12 disposed between the first electrode layer 10 and 100 and the second electrode layer 11 and 101.

The protection layers 16a and 16b may include a material having some degree of flexibility and stiffness so as to not affect a warp or bend of the electrode stack structure. In addition, the protection layers 16a and 16b may protect the electrode stack structure from physical impact and/or chemical influence applied from outside the electrode stack structure.

Since the inside of the electrode stack structure receives a compressive force when the electrode stack structure is bent, individual layers of the electrode stack structure generate wrinkles to alleviate compressive stress due to the compressive force. When the wrinkles are generated in the individual layers of the electrode stack structure, an interval between each of the individual layers may widen, and alignment positions of the individual layers may be irreversibly changed or the individual layers may be folded. Where the protection layers 16a and 16b having flexibility and stiffness are located outside the electrode stack structure, the protection layers 16a and 16b may suppress a small transformation having a small radius of curvature, such as a wrinkle, to reduce or effectively prevent a large transformation from occurring, and may alleviate stress which the internal layers (namely, the individual layers) of the electrode stack structure receive.

The bending stiffness of the protection layers 16a and 16b may have a larger value than an average bending stiffness of the individual layers of the electrode stack structure. In order to reduce or effectively prevent an interval between each of the individual layers from widening by preventing the generation of wrinkles of the individual layers and dispersing pressure on the individual layers, the bending stiffness of the protection layers 16a and 16b may be designed to be larger than the average bending stiffness of the individual layers. In one embodiment, for example, the bending stiffness of the protection layers 16a and 16b may be at least about 1.5 times the average bending stiffness of the individual layers.

A thickness of the protection layers 16a and 16b may be from about 15 micrometers (um) to about 1 millimeter (mm), and the tensile modulus of elasticity of the protection layers 16a and 16b may be from about 0.5 gigapascals (GPa) to about 300 GPa. The protection layers 16a and 16b may include a polymer film, a film including a laminated polymer film layer, a metal foil or a complex material film including carbon.

An embodiment of a fixing element of an electrode stack structure of a flexible secondary battery according to the present invention will now be described.

Figure 3A:
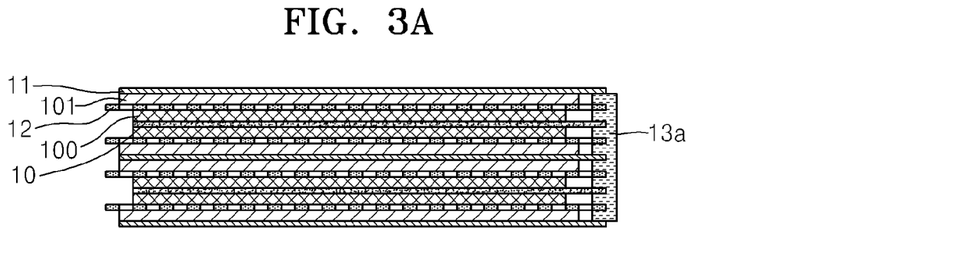
FIGS. 3A and 3B are diagrams illustrating another embodiment of a flexible secondary battery including a fixing element of an electrode stack structure, according to the present invention.
Figure 3B:
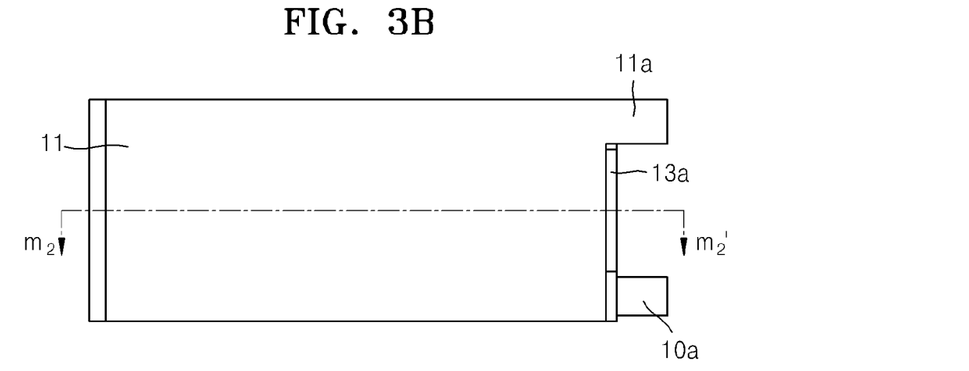

FIGS. 3A and 3B are diagrams illustrating another embodiment of a flexible secondary battery including a fixing element 13a of an electrode stack structure, according to the invention. FIG. 3B illustrates a plan view of the structure, and FIG. 3A illustrates a cross-sectional view taken along line m2-m2' of FIG. 3B.

Referring to FIGS. 3A and 3B, at a first end portion of each of the first metal current collector 10, the second metal current collector 11 and the isolation layer 12, the fixing element 13a is disposed to fix the first and second metal current collectors 10 and 11 and the isolation layer 12. The fixing element 13a may include an adhesive and/or an adhesive-coated tape, and may include an insulating adhesive to reduce or effectively prevent an electrical short circuit between the first metal current collector 10 and the second metal current collector 11. A portion of the fixing element 13a may be between each pair of adjacent first metal current collector 10 and isolation layer 12 and/or between each pair of adjacent second metal current collector 11 and isolation layer 12 as illustrated in FIG. 3A, but the invention is not limited thereto or thereby.

In one embodiment of a manufacturing method of a flexible secondary battery, the first metal current collector 10, the second metal current collector 11 and the isolation layer 12 of the electrode stack structure may be combined by forming an adhesive of the fixing element 13a between each of these elements beforehand and then aligning these elements as required by the electrode stack structure. In addition or alternatively, after the first metal current collector 10, the second metal current collector 11 and the isolation layer 12 of the electrode stack structure are aligned and stacked, the fixing element 13a may be formed by coupling an adhesive-coated tape to end portions of the first metal current collector 10, the second metal current collector 11 and the isolation layer 12 between the connection tabs 10a and 11a.

Figure 4A:
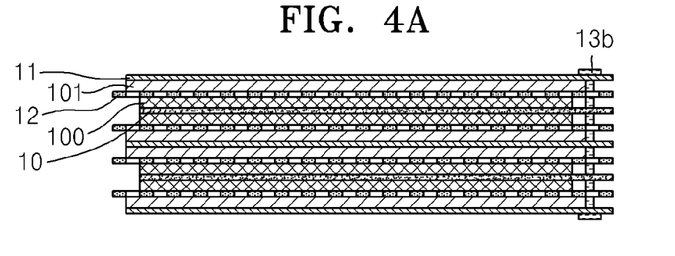
FIGS. 4A and 4B are diagrams illustrating another embodiment of a flexible secondary battery including a fixing element in a hole defined in an electrode stack structure, according to the present invention.
Figure 4B:
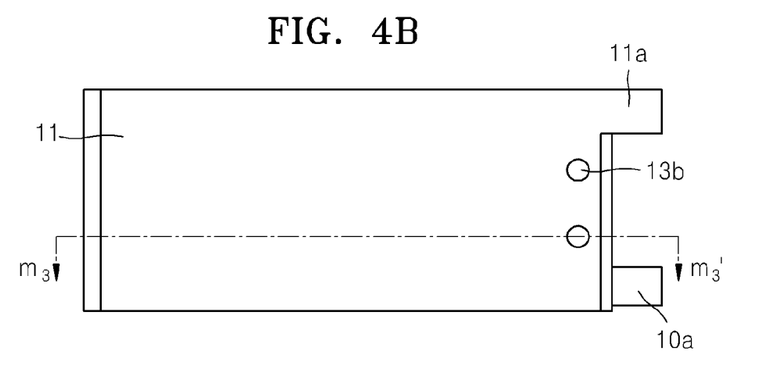

FIGS. 4A and 4B are diagrams illustrating another embodiment of a flexible secondary battery including a fixing element 13b in a hole defined in the electrode stack structure, according to the present invention. FIG. 4B illustrates a plan view of the structure, and FIG. 4A illustrates a cross-sectional view taken along line m3-m3' of FIG. 4B.

Referring to FIGS. 4A and 4B, a hole is defined in a first end portion of each of the first metal current collector 10, the second metal current collector 11 and the isolation layer 12 of the electrode stack structure between the connection tabs 10a and 11a, and the fixing element 13b which fixes these elements together may be disposed in the hole. The fixing element 13b may be a rivet and/or string including an insulating material. In one embodiment, for example, the fixing element 13b may include a riveted polymer pillar. In one embodiment of a manufacturing method of a flexible secondary battery, an electrode stack structure may be formed by stacking the first metal current collector 10, the second metal current collector 11 and the isolation layer 12 of the electrode stack structure, in which a hole has been formed beforehand, and then inserting a rivet or string to the elements in the electrode stack structure. A single fixing element 13b may be inserted through all the holes which are aligned with each other as illustrated in FIG. 4A, but the invention is not limited thereto or thereby.

Figure 5A:
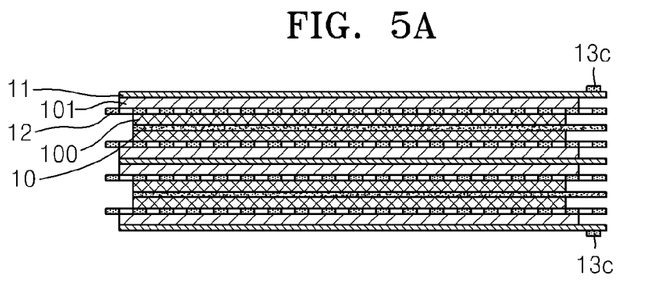
FIGS. 5A and 5B are diagrams illustrating another embodiment of a flexible secondary battery including a groove defined in one end portion of an electrode stack structure and a fixing element, according to the present invention.
Figure 5B:
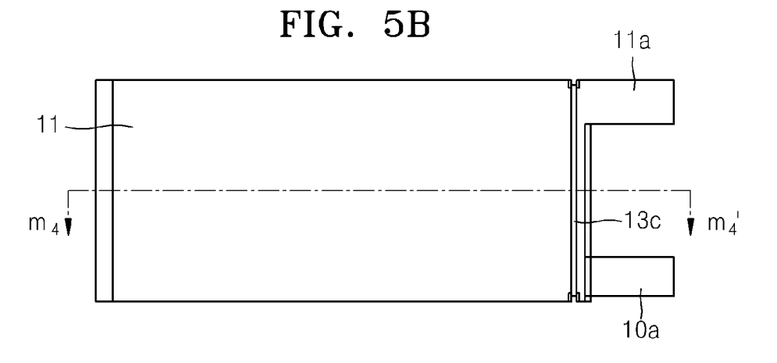

FIGS. 5A and 5B are diagrams illustrating another embodiment of a flexible secondary battery including a groove defined in one end portion of an electrode stack structure and a fixing element 13c, according to the present invention. FIG. 5B illustrates a plan view of the structure, and FIG. 5A illustrates a cross-sectional view taken along line m4-m4' of FIG. 5B.

Referring to FIGS. 5A and 5B, a groove in which the fixing element 13c may be inserted may be defined in a first end portion of each of the first metal current collector 10, the second metal current collector 11 and the isolation layer 12 spaced apart from and outside of the connection tabs 10a and 11a. The groove may be recessed from an outer side edge of each of the first metal current collector 10, the second metal current collector 11 and the isolation layer 12 as shown in FIG. 5B, while the fixing element 13c protrudes from upper and lower surfaces of the electrode stack structure as shown in FIG. 5A. Alternatively, the groove may be recessed from the upper and lower surfaces of the electrode stack structure such as from outer surfaces of the outermost second metal current collectors 11. That is, the fixing element may contact outer surfaces of the first and second metal current collectors 10 and 11, but is not limited thereto or thereby. The fixing element 13c may have a structure which surrounds the groove such as a band or a ring, but is not limited thereto or thereby. Although FIGS. 5A and 5B illustrate an example in which the fixing element 13c surrounds the groove defined in the first end portion of each of the first metal current collector 10, the second metal current collector 11 and the isolation layer 12, the location of the groove is not limited thereto. In an alternative embodiment, the groove may be defined in the vicinity of the connection tabs 10a and 11a. In another embodiment, the fixing element 13c may include an adhesive disposed into the groove.

Figure 6A:
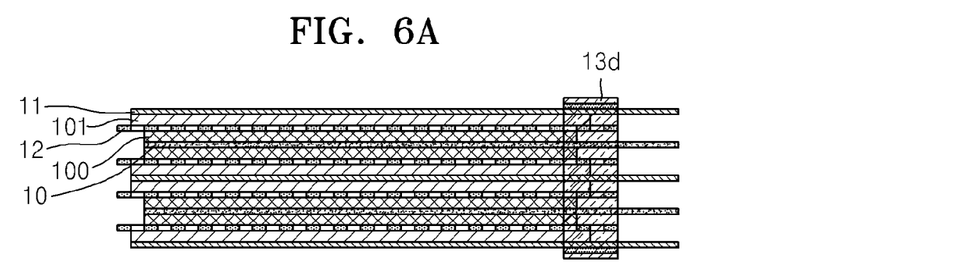
FIGS. 6A and 6B are diagrams illustrating another embodiment of a flexible secondary battery including a fixing element surrounding an electrode stack structure, according to the present invention.
Figure 6B:
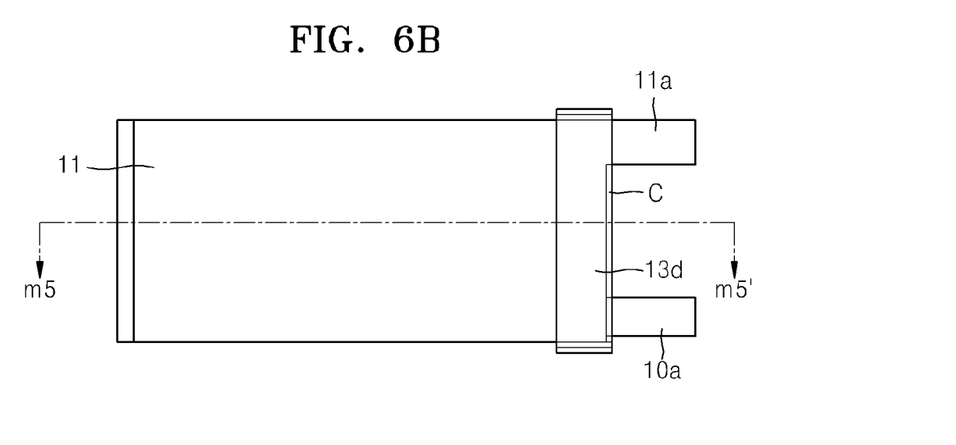

FIGS. 6A and 6B are diagrams illustrating another embodiment of a flexible secondary battery including a fixing element 13d surrounding an electrode stack structure, according to the present invention. FIG. 6B illustrates a plan view taken along line m5-m5' of the structure, and FIG. 6A illustrates a cross-sectional view of the structure.

Referring to FIGS. 6A and 6B, a first end portion of the electrode stack structure, in which the connection tabs 10a and 11a are disposed, is surrounded with the fixing element 13d, and thus, the layers of the electrode stack structure are fixed. In embodiments, the fixing element 13d may be an adhesive or a tape including an adhesive. As illustrated in FIGS. 6A and 6B, the fixing element 13d protrudes from an outer surface of the electrode stack structure, whereas in FIGS. 5A and 5B, the fixing element 13c does not protrude from the outer surface of the electrode stack owing to the recessed groove.

As described above, in one or more embodiment of a flexible secondary battery including an electrode stack structure according to the present invention, a fixing element may be disposed at only one end portion of the electrode stack structure in various forms.

Figure 7A:
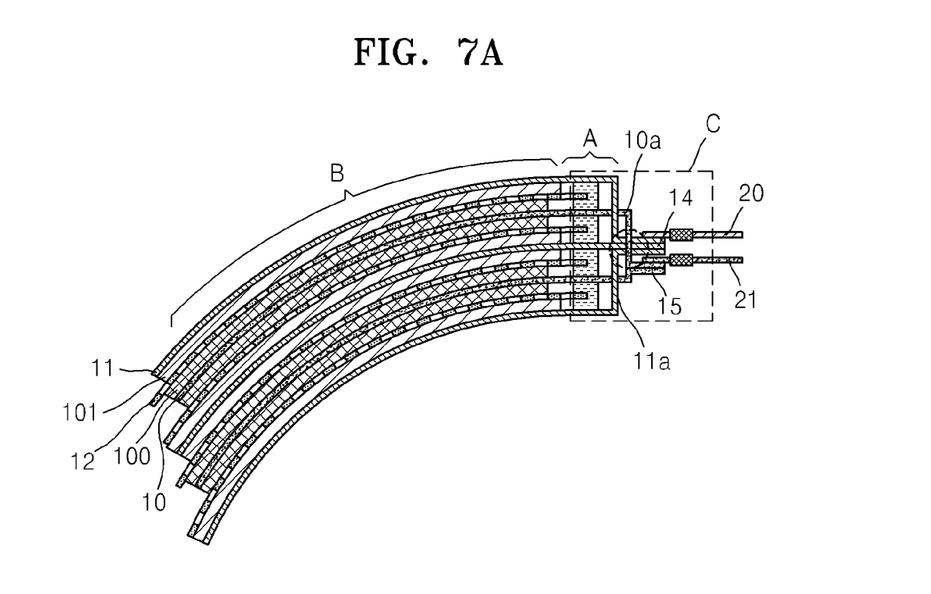
FIGS. 7A through 7C are diagrams illustrating various embodiments of a flexible secondary battery including connection tabs of an electrode stack structure connected to lead tabs, according to the present invention.
Figure 7B:
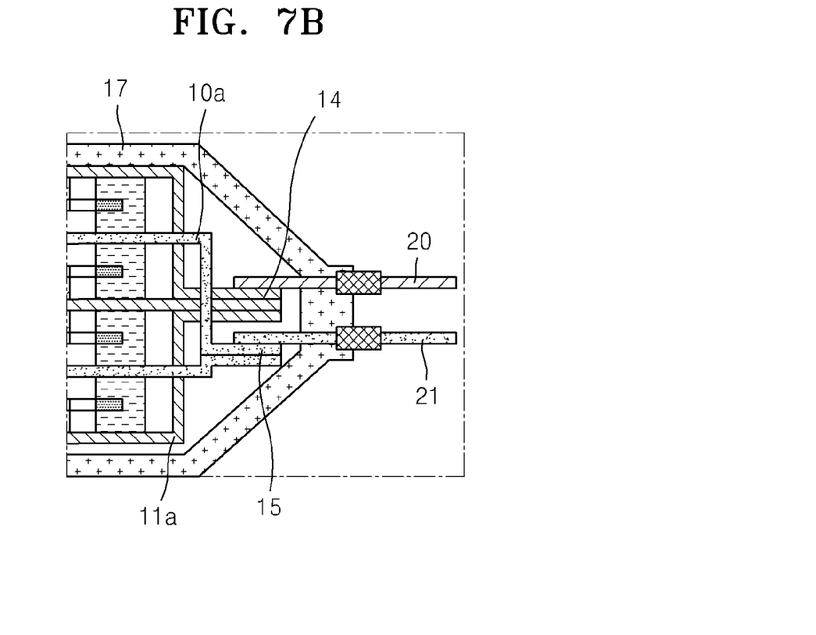
Figure 7C:
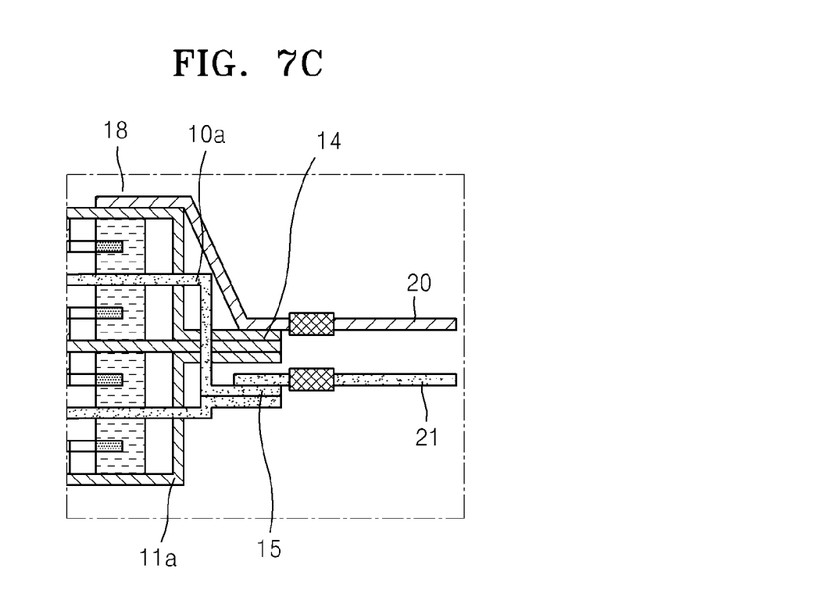

FIGS. 7A through 7C are diagrams illustrating various embodiments of a flexible secondary battery including the connection tabs 10a and 11a of the electrode stack structure respectively connected to lead tabs 20 and 21, according to the present invention. FIGS. 7B and 7C are enlarged views of portion C shown in FIG. 7A.

Referring to FIG. 7A, the first electrode layer 10 and 100, the second electrode layer 11 and 101, and the isolation layer 12 disposed between the first electrode layer 10 and 100 and the second electrode layer 11 and 101 are stacked in the electrode stack structure, and the connection tab 10a and the connection tab 11a protrude from a first end portion of the first metal current collector 10 of the first electrode layer 10 and 100 and a first end portion of the second metal current collector 11 of the second electrode layer 11 and 101, respectively. Extension portions 14 and 15 of the connection tabs 11a and 10a are respectively connected to external lead tabs 20 and A first end portion A of the electrode stack structure in which the connection tabs 10a and 11a are disposed may be fixed (e.g., essentially not bendable) by the fixing element 13, and a remaining portion B of the electrode stack structure may be bent. Thus, a portion C in which the connection tabs 10a and 11a are disposed may be relatively weak.

To reduce weakness of the portion C, as illustrated in FIG. 7B, a reinforcement element 17 may be disposed in the portion C in which the connection tabs 10a and 11a are located. The reinforcement element 17 may include a stiff film and/or an external pouch. The reinforcement element 17 may be disposed on an outer surface of the electrode stack structure, and the external leads 20 and 21 may protrude from an inside of the reinforcement element 17 to an outside thereof such as through an opening defined in the reinforcement element 17.

In addition, as illustrated in FIG. 7C, an area in which the connection tabs 10a and 11a are disposed may be reinforced by extending at least one of the lead tabs 20 and 21 toward the electrode stack structure such as by forming an extension portion 18 which is continuous with the respective lead tab 20 or 21. The extended portion of the lead tab may be on and/or contact the connection tabs 10*a* and 11*a*. The extended portion of the lead tab may also overlap and/or contact an outer surface of the second metal current collector 11 as illustrated in FIG. 7C.

Figure 8:
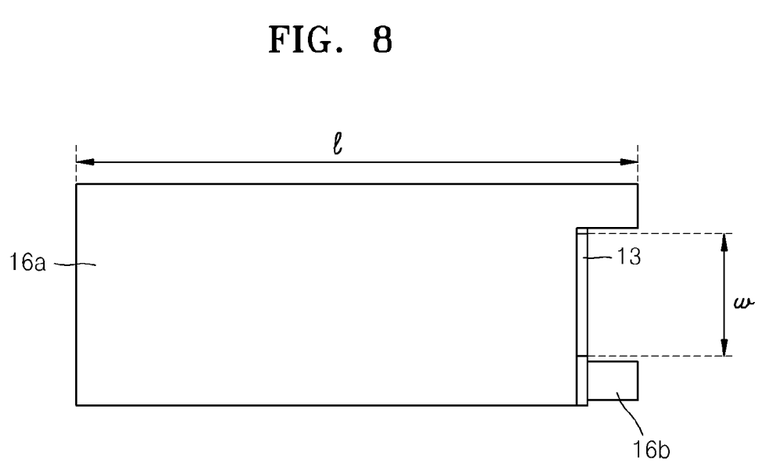
FIG. 8 is a diagram illustrating a relationship between a length of a fixing element of an electrode stack structure and a total length of the electrode stack structure.

FIG. 8 is a diagram illustrating a relationship between a length of the fixing element 13 and a total length of an electrode stack structure.

Referring to FIG. 8, a length 'w' of the fixing element 13 may be about 2 mm or greater. Each of the layers of the electrode stack structure may be repeatedly bent, for example, rotated, centered on the fixing element 13 which is at a first end portion of the electrode stack structure, and the layers of the electrode stack structure may be dislocated from each other at an opposing second end portion of the electrode stack structure, in which a fixing element is not disposed. If the length 'w' of the fixing element 13 is too short, the fixing element 13 may not prevent the dislocation of the layers of the electrode stack structure due to the rotation, and thus, the alignment of the layers of the electrode stack structure may not be maintained.

The alignment of the layers of the electrode stack structure may be related to a ratio of a total length 'l' of the electrode stack structure to the length 'w' of the fixing element 13. The total length 'l' may be taken in a first (e.g., length) direction of the electrode stack structure while the length 'w' of the fixing element 13 may be taken in a second direction perpendicular to the first direction. If the total length 'l' of the electrode stack structure is excessively long compared to the length 'w' of the fixing element 13, during a repeated bending operation of the electrode stack structure, rates of change in the positions of the layers may increase due to the rotation at the second end portion of the electrode stack structure, in which a fixing element is not disposed. Thus, the alignment of the layers of the electrode stack structure may not be maintained. A ratio of the total length 'l' of the electrode stack structure to the length 'w' of the fixing element 13 may be about 20 or less.

According to one or more embodiment of the present invention described above, an electrode stack structure of a flexible secondary battery includes a fixing element which fixes layers of the electrode stack structure only at a first end portion of the electrode stack structure, and an opposing second end portion of the electrode stack structure is flexible. Thus, the electrode stack structure may maintain stability within the flexible secondary battery even with a repeated warping motion or bending motion of the second end portion. In addition, stable operational characteristics of the layers of the electrode stack structure may be maintained by disposing a reinforcement element around connection tabs extended from the layers of the electrode stack structure and the fixing element.

It should be understood that the embodiments described herein should be considered in a descriptive sense only and not for purposes of limitation. Descriptions of features within each embodiment should typically be considered as available for other similar features or aspects in other embodiments.

What is claimed is:

1. A flexible secondary battery comprising:
    an electrode stack structure comprising:
        a first electrode layer comprising a first metal current collector;
        a second electrode layer comprising a second metal current collector;
        an isolation layer between the first electrode layer and the second electrode layer;
        a first connection tab extended from an end portion of the first metal current collector at a first end portion of the first electrode layer, the first connection tab defining a first extension portion thereof;
        a second connection tab extended from an end portion of the second metal current collector at a first end portion of the second electrode layer, the second connection tab defining a second extension portion thereof; and
        a fixing element which fixes the end portions of the first and second metal current collectors from which the first and second connection tabs respectively extend, only at a first end portion of the electrode stack structure,
    wherein
        second end portions of the first and second electrode layers opposite to the first end portions thereof are movable, and
        the first extension portion of the first connection tab and the second extension portion of the second connection tab are respectively connected to extended portions of a first external lead tab and a second external lead tab.

2. The flexible secondary battery of claim 1, further comprising a protection layer on an outer surface of the electrode stack structure.

3. A flexible secondary battery comprising:
    an electrode stack structure comprising;
        a first electrode layer comprising a first metal current collector;
        a second electrode layer comprising a second metal current collector;
        an isolation layer between the first electrode layer and the second electrode layer;
        connection tabs respectively extended from an end portion of the first metal current collector at a first end portion of the first electrode layer and an end portion of the second metal current collector at a first end portion of the second electrode layer; and
        a fixing element which fixes the end portions of the first and second metal current collectors only at a first end portion of the electrode stack structure; and
    a protection layer on an outer surface of the electrode stack structure,
    wherein
    second end portions of the first and second electrode layers opposite to the first end portions thereof are movable, and
    a bending stiffness of the protection layer is larger than an average bending stiffness of individual layers of the electrode stack structure.

4. The flexible secondary battery of claim 3, wherein the bending stiffness of the protection layer is at least about 1.5 times the average bending stiffness of the individual layers of the electrode stack structure.

5. The flexible secondary battery of claim 2, wherein a thickness of the protection layer is from about 15 micrometers to about 1 millimeter.

6. The flexible secondary battery of claim 2, wherein a tensile modulus of elasticity of the protection layer is from about 0.5 gigapascals to about 300 gigapascals.

7. The flexible secondary battery of claim 2, wherein the protection layer comprises a polymer film, a film comprising a laminated polymer film layer, a metal foil or a complex material film comprising carbon.

8. The flexible secondary battery of claim 1, wherein the fixing element comprises an adhesive or an adhesive-coated tape.

9. The flexible secondary battery of claim 1, wherein
the electrode stack structure further comprises a hole defined in one end portion of each of the first metal current collector, the second metal current collector and the isolation layer at the first end portion of the electrode stack structure, and
the fixing element is in the holes.

10. The flexible secondary battery of claim 1, wherein
the electrode stack structure further comprises a groove defined in one end portion of each of the first metal current collector, the second metal current collector and the isolation layer at the first end portion of the electrode stack structure, and the fixing element may be in the groove.

11. The flexible secondary battery of claim 1, wherein the fixing element surrounds outer surfaces of the first end portion of the electrode stack structure.

12. The flexible secondary battery of claim 1, further comprising a reinforcement element around the connection tabs.

13. The flexible secondary battery of claim 1, wherein
a total length of the electrode stack structure is taken in a first direction, and
a length of the fixing element at the first end portion of the electrode stack structure is taken in a second direction perpendicular to the first direction and is about 2 millimeters or greater.

14. The flexible secondary battery of claim 1, wherein a ratio of the total length of the electrode stack structure to the length of the fixing element is 20 or less.

15. A method of manufacturing a flexible secondary battery, the method comprising:
providing an electrode stack structure of which layers thereof are fixed at only a first end portion thereof, comprising:
providing a first electrode layer comprising a first metal current collector,
providing a second electrode layer comprising a second metal current collector,
providing an isolation layer between the first electrode layer and the second electrode layer,
providing a first connection tab extended from the end portion of the first metal current collector at a first end portion of the first electrode layer, the first connection tab defining a first extension portion thereof,
providing a second connection tab extended from the end portion of the second metal current collector at a first end portion of the second electrode layer, the second connection tab defining a second extension portion thereof; and
providing a fixing element which fixes the end portions of the first and second metal current collectors from which the first and second connection tabs respectively extend, only at the first end portion of the electrode stack structure,
wherein
second end portions of the first and second electrode layers opposite to the first end portions thereof are movable, and
the first extension portion of the first connection tab and the second extension portion of the second connection tab are respectively connected to extended portions of a first external lead tab and a second external lead tab.

16. The method of claim 15, wherein the providing a fixing element contacts the fixing element with the first and second metal current collectors.

17. The method of claim 15, wherein the providing a fixing element contacts the fixing element with only outer surfaces of the first and second metal current collectors.

* * * * *